C. E. WATERS.
LAWN TRIMMER.
APPLICATION FILED JUNE 22, 1908.
925,671.
Patented June 22, 1909.
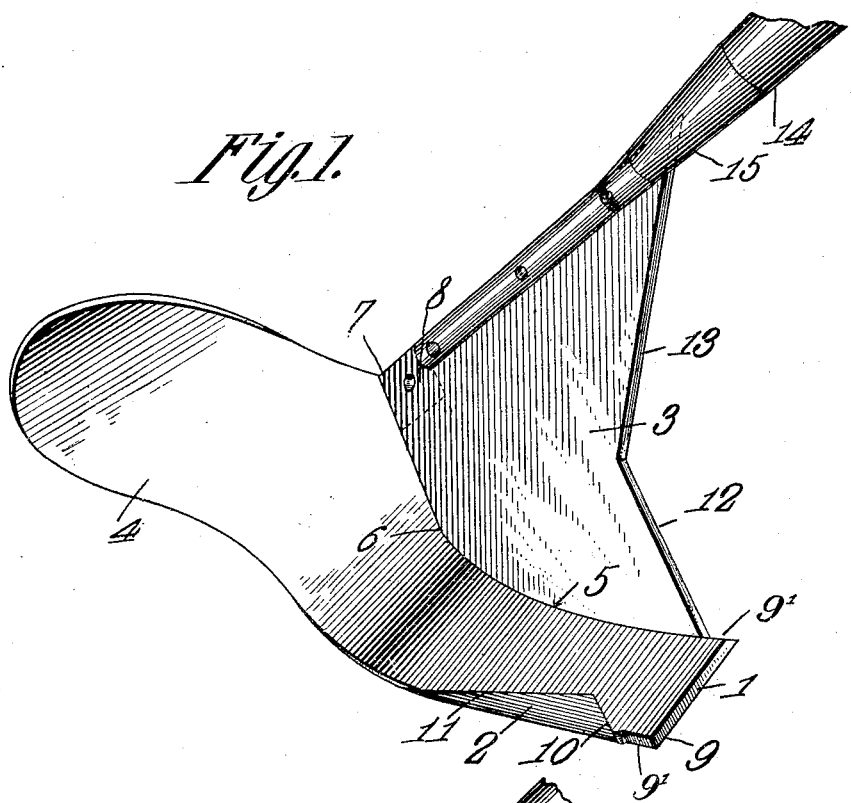
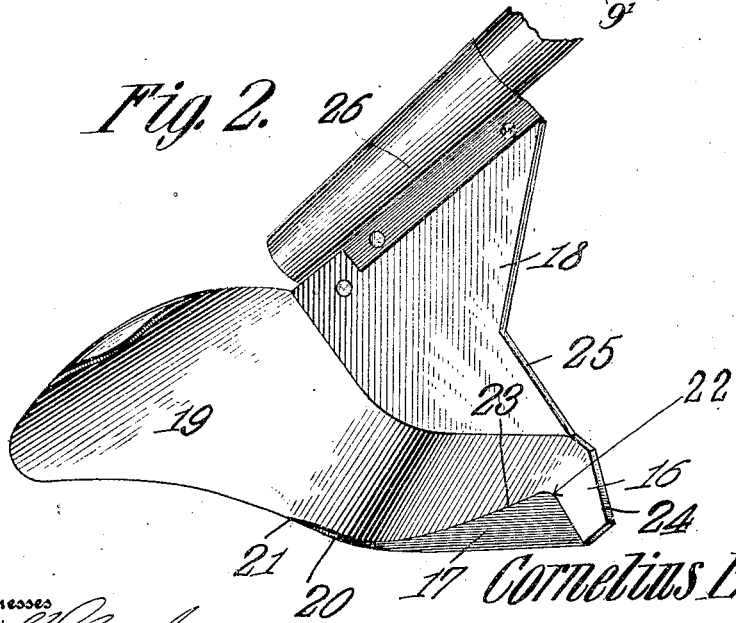
Witnesses
Inventor
Cornelius E. Waters
By C. A. Snow & Co.
Attorneys

UNITED STATES PATENT OFFICE.

CORNELIUS E. WATERS, OF LOS ANGELES, CALIFORNIA.

LAWN-TRIMMER.

No. 925,671.        Specification of Letters Patent.        Patented June 22, 1909.

Application filed June 22, 1908. Serial No. 439,794.

*To all whom it may concern:*

Be it known that I, CORNELIUS E. WATERS, a citizen of the United States, residing at 1523 East Twenty-second street, Los Angeles, in the county of Los Angeles and State of California, have invented a new and useful Lawn-Trimmer, of which the following is a specification.

This invention relates to tools, or implements for trimming and weeding lawns and gardens, and has for its object to provide an improved tool or implement of this kind by means of which the work may be effectively done in a comparatively brief space of time, and by means of which also sod may be cut uniformly and straight, and the tool used effectively about trees and plants.

The invention consists of an improved trimming and weeding tool constructed as hereinafter set forth and claimed.

Referring to the drawing—Figure 1 is a perspective view of a trimming and weeding tool constructed in accordance with this invention. Fig. 2 is a modification thereof.

Referring to Fig. 1 the tool is formed with a flat extended bottom portion 1, a short rearwardly tapering vertical side 2 adapted to cut roots, an angular elevated vertical side 3 to trim the side of a path, and a rearwardly extending portion 4 projecting upward from the bottom 1 and curving laterally from and being diagonal to the side 3, the extension 4 being adapted to carry off and deliver to one side the cut sod, weeds etc.

In the construction shown in Fig. 1, the parts are cut out from a sheet metal blank, the portion 3 being integral with the portion 1 to the point 5, the curved edge 6 of the part 3 from the point 5 to its end 7 being separate from the portion 4. The portion 4 is formed on one side with the lip 8. In forming the tool of the shape shown in Fig. 1, the sides 2 and 3 are bent up to a vertical position, and the extension 4 is bent up to bring the curved edge 6 of the portion 4 against the curved edge 6 of the side 3, in which position they are held together by the lip 8 on portion 4 bent over against the side 3 and riveted thereto. The forward end portion of the bottom 1 is substantially horizontal and projects slightly beyond the sides 2, and 3, and is formed with a transverse beveled cutting edge 9, and side edges 9'. The edges 10, 11 of the side 2, and the edges 12, 13 of the side 3, preferably inclined rearward toward each other to give a shearing cut, are formed with a beveled cutting edge. The tool is provided with a suitable handle 14 mounted in a metal socket 15 riveted to and in alinement with the upper inclined edge of the side 3.

In using the tool it is drawn toward the person using it, and in trimming a lawn or garden the side 2 cuts the roots which grow under the path, the portion 1 cuts the bottom of the path and the portion 3 cuts the side of the path. The curved extension 4 delivers the cut sod and earth from the bottom 1 over onto the walk similarly to the operation of the mold board of a plow.

In the modification in Fig. 2 the tool is formed from a sheet metal blank with the flat bottom portion 16, a short rearwardly tapering side 17 bent up to a vertical position, an elevated side 18 bent up to a vertical position and the rear extension 19 bent upward, and extending diagonally from the rear of bottom portion 16 and from the side 18 and preferably of a concave form. The bottom portion 16 is also formed with the curved edge 20 between the rear end of side 17 and a point 21 where the extension 19 projects from bottom portion 16. The edges 22, 23 of side 17, the edges 24 and 20 of bottom 16, and the edge 25 of side 18 are formed with a beveled cutting edge.

The tool is operated by a suitable handle, which may be secured to a shank 26 fastened to the side 18. The tool here described operates similarly to that set forth in Fig. 1 to cut horizontally, and along the side of a path, as also to cut the roots. An additional cutting edge is provided in rear of side 17 which adapts the tool for additional cutting work in certain places. The tool preferably has its body portion made from a single piece of metal, and may be stamped out of sheet steel or cast.

By means of this tool a lawn may be much more quickly trimmed than with a spade and in much less time. It can be used very easily about trees and plants and can be pulled through the soil turning it over similarly to a plow.

Having described the invention, I claim—

An edge trimmer comprising a share formed from a sheet of metal having a plane side portion and a curved bottom portion, said portions having their forward edges sharpened and being integrally joined in the vicinity of their sharpened edges, and a lip carried by one of the said portions and lying against the other portion, and a device securing the lip to the portion against which it lies.

In testimony that I claim the foregoing as my own, I have hereto affixed my signature in the presence of two witnesses.

CORNELIUS E. WATERS.

Witnesses:
ROBERT CARHART,
GEORGE H. KELCH.